United States Patent [19]

Appleby et al.

[11] 3,989,565
[45] Nov. 2, 1976

[54] TIRE BUILDING MACHINE SERVER

[75] Inventors: Paul E. Appleby, Cuyahoga Falls; Michael W. Smith, Mogadore, both of Ohio

[73] Assignee: The Goodyear Tire & Rubber Company, Akron, Ohio

[22] Filed: June 26, 1975

[21] Appl. No.: 590,645

[52] U.S. Cl. .................................. 156/133; 83/508; 156/405; 198/688; 226/156
[51] Int. Cl.² .................................................... B29H 17/20
[58] Field of Search ............ 156/116, 123 R, 128 R, 156/130, 133, 394 R, 405, 421, 250, 510, 517, 523; 198/127 R, 218, 183; 226/108, 115, 156; 271/191, 267; 83/508, 676

[56] References Cited
UNITED STATES PATENTS

| | | | |
|---|---|---|---|
| 2,761,488 | 9/1956 | Kreighbaum | 156/405 |
| 2,820,542 | 1/1958 | Oswald | 198/218 |
| 3,026,230 | 3/1962 | Nebout | 156/128 R |
| 3,407,106 | 10/1968 | Barefoot | 156/405 |
| 3,413,174 | 11/1968 | Porter | 156/405 |
| 3,479,238 | 11/1969 | Kehoe et al. | 156/123 |
| 3,766,816 | 10/1973 | Loveless | 83/508 |

Primary Examiner—William A. Powell
Assistant Examiner—John E. Kittle
Attorney, Agent, or Firm—F. W. Brunner; R. S. Washburn

[57] ABSTRACT

A server particularly adapted for delivering tire sidewall and the like in strip form to a tire building drum. Features a cold, non-driven but rotatable knife for cutting off a measured length of strip and projecting it forward directly to contact a partially completed tire carcass on the drum by a shuttle having closely spaced rollers which first draw the strip straight for cut-off, then when the cut-off is made, move the strip forward relative to the shuttle, and finally free wheel to allow the drum to draw the strip off the shuttle. A spoon-like tensioner controls the strip as it is wound about the drum.

9 Claims, 5 Drawing Figures

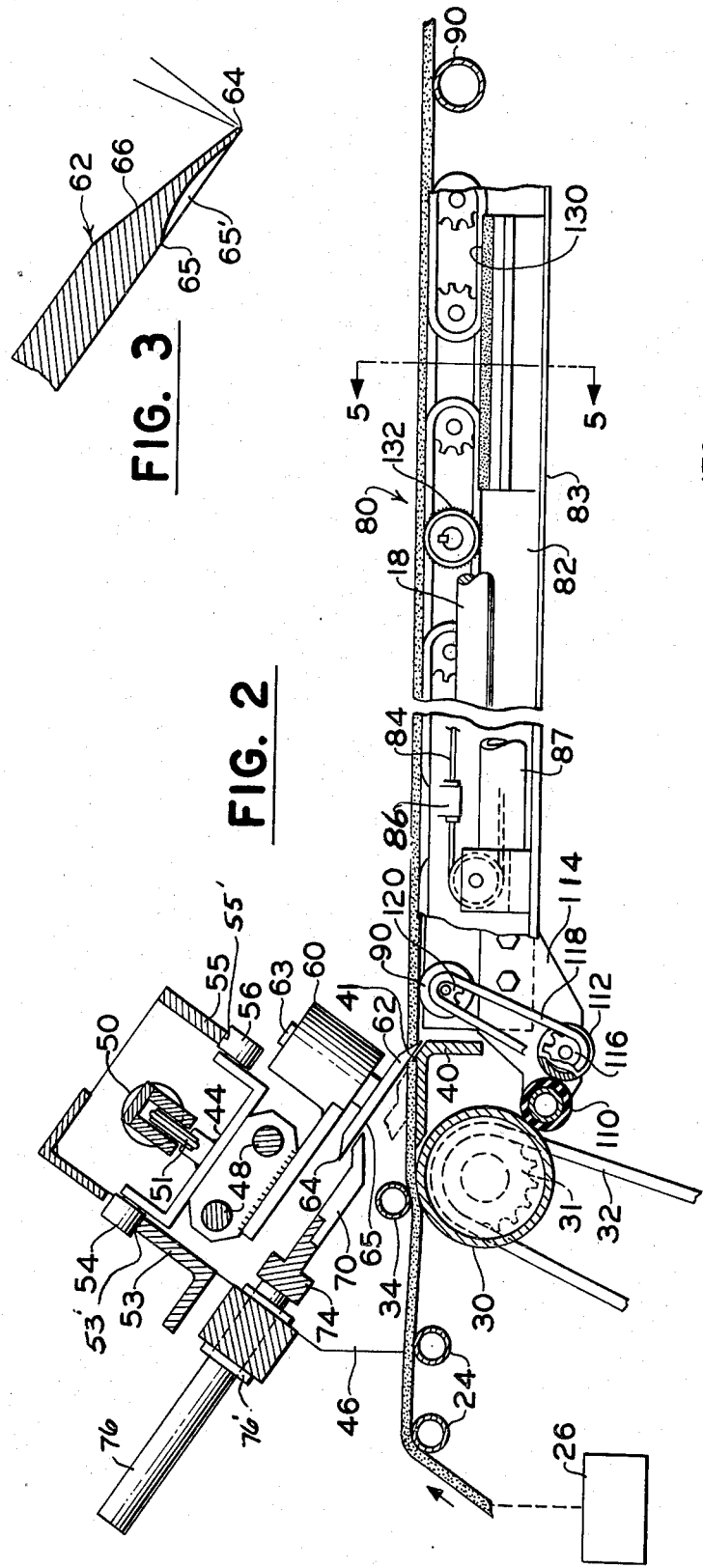
FIG. 3
FIG. 2
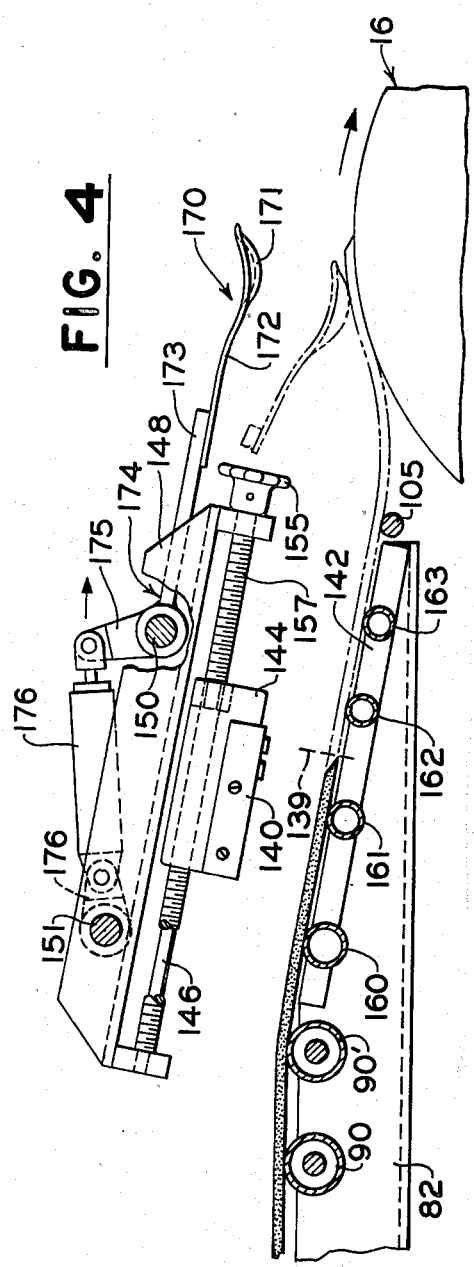
FIG. 4
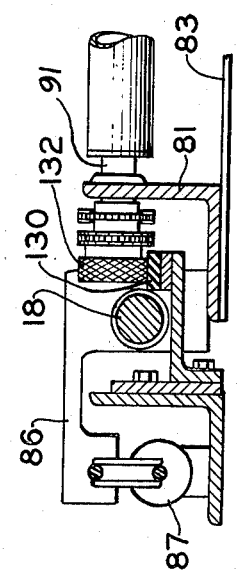
FIG. 5

TIRE BUILDING MACHINE SERVER

The foregoing abstract is not to be taken as limiting the invention of this application, and in order to understand the full nature and extent of the technical disclosure of this application, reference must be made to the accompanying drawings and the following detailed description.

The present invention relates to building vehicle tires, particularly to a server for use in tire building, and more particularly to a server for serving tire building material free of cord or like filamentary reinforcement, and particularly tire sidewall building material, to a tire building drum.

By way of illustration, a specific embodiment showing the best mode presently contemplated and exemplifying the principles of the invention, will be described with reference to and by the attached drawings in which:

FIG. 2 is a partial elevation, enlarged, of the apparatus of FIG. 1 taken as indicated by the line 2—2 in FIG. 1;

FIG. 3 is an illustrative section view of a portion of the apparatus of FIG. 1;

FIG. 4 is also a partial elevation, enlarged, of the apparatus of FIG. 1 taken as indicated by the line 4—4 in FIG. 1;

FIG. 5 is a detail sectional view of a portion of the apparatus of FIG. 1 taken along the line 5—5 in FIG. 2.

Figure 1:
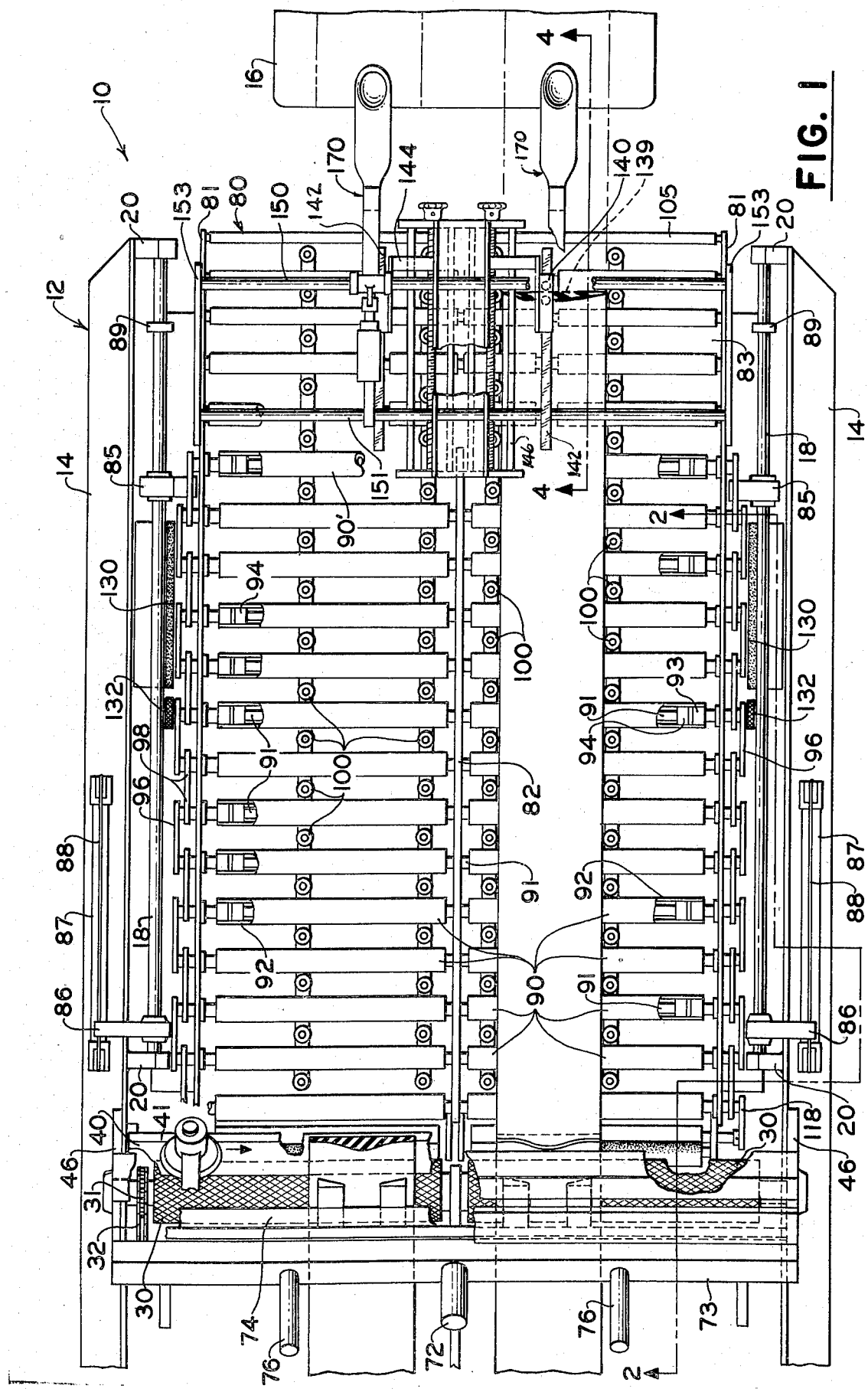
FIG. 1 is a plan view of a server in accordance with the invention, parts being broken away more clearly to illustrate features of the invention.

Referring to the drawings and particularly to FIGS. 1 and 2, the server 10 in accordance with the present invention comprises a main frame 12 including a pair of longitudinal side rails 14 supported by suitable structure (not shown) in fixed relation to a tire building drum 16 having a partially built tire carcass thereon. Each side rail 14 supports a longitudinally extending slide bar 18 which is fixed on the respective side rail by and extends between the respective mounting blocks 20. The slide bars are parallel to each other and disposed in planes perpendicular to the rotational axis of the tire building drum and are spaced equally apart axially of the drum a suitable distance on opposite sides of its axial mid-plane. The frame 12 also supports a series of strip guiding rolls 24 mounted for rotation about axes parallel to the rotational axis of the drum. Tire building strip material, particularly sidewall strip, is carried from a conventional supply 26 thereof over the rolls 24 to a feed roll 30 which is mounted in the main frame for rotation about an axis parallel to the drum axis. The sprocket 31 corotatably mounted on the feed roll journal is connected by a conventional chain 32 to a drive means (not shown) which operates the roll 30 to move the strip forwardly toward the building drum. A small spring-loaded riding roll 34 cooperates with the feed roll to insure the positive advance of the strip. The feed roll preferably has its cylindrical outer surface knurled.

The server 10 incorporates cutoff means operable to cut a precise length of strip material or sidewall as required for the particular carcass being built on the building drum. In the present embodiment, the cutoff means comprises a knife bar 40 having a shear edge 41 mounted on and extending between the side rails 14 of the main frame at a fixed distance from the building drum. The surface of the knife bar exposed to contact with the strip may, if desired, be covered with a release material such as a tape comprising polytetrafluoroethylene or the like.

The cutoff means includes a carriage 44 movable between the side plates 46 of the main frame, on a pair of support rods 48 fixed to and extending between the side plates, by a cable cylinder 50 extending between and fixed to the respective side plates and having its cable 51 attached to the carriage 44 to effect the movement. The carriage is additionally guided by a structural angle 53 fixed to and extending between the side plates and having a surface on which bears a roller 54 carried by the carriage. A flat bar 55 having a guide surface 55' is engaged by a second roller 56 mounted rotatably on the carriage. The carriage 44 transports a bearing housing 60 which rotatably supports a circular knife 62 and its shaft 63. The knife is disposed to rotate in a plane inclined at approximately 35° to the plane of the strip and in shearing contact with the shear edge 41. The circular knife 62, contrary to usual practice in severing sidewall or like material, is cold, that is, not externally supplied with heat. Additionally, see FIG. 3, the knife is provided with a concentric annular hollow ground relief 65' radially inward of its shearing periphery 64 in the side adjacent to the shear edge 41. The opposite surface 66 of the disc is tapered away from the periphery at an angle of approximately 15°; its periphery is provided with a suitable narrow land at approximately 80°; both angles being referred to the plane of knife rotation. The knife is undriven and rotates only in response to the lateral movement of the carriage as the knife shears along the edge 41. The cable cylinder 50 is actuated in response to a signal provided by a photocell, presently to be further described, to provide a measured length of strip ready for application to the tire drum.

While the knife 62 moves along the edge 41, severing the strip, presser feet 70 are urged toward the knife bar 40 to stabilize the strip close to the edge 41. The feet 70 are suitably shaped to conform with the profile of strip, and can be provided with a coating or layer of nonadherent substance such as polytetrafluoroethylene. An air cylinder 72 fixed on a cross-member 73 of the frame is connected to move a mounting bar 74 toward and away from the bar 40 parallel and close to the plane of the knife 62. The bar 74 has a pair of guide pins 76 which slide in the guide bushings 76' which are fixed in the member 73. The feet 70 are selectively positioned along and secured to the bar 74 to suit the width and lateral location of the strip.

Another feature of the invention is the shuttle 80 which is movable between a rearward or receiving position, shown in FIGS. 1 and 2, and a forward or delivery position close to the building drum is indicated in FIG. 4. The shuttle 80 comprises a pair of side members 81 and a center member 82, extending longitudinally parallel to the side rails 14 of the main frame 12, and secured on a floor plate 83 to form a rigid subframe which is slidably carried on the longitudinal bars 18 by the bearing blocks 85, 86 fixed on the respective side members 81. The blocks 86 extend outward over the rails 14 and are attached respectively to the cables 88 of the cable cylinders 87 which are fixed on the side rails 14. Actuation of the cable cylinders 87 moves the shuttle 80 between the receiving position shown and the delivery position which is adjustably determined by abutment of the bearing blocks 85 against the stop collars 89 which are adjustable along the respective bars 18.

As a further feature of the invention, the shuttle includes a plurality of roll assemblies 90 extending parallel to the axis of the drum 16, each being supported for rotation in bearings in the center member 82 and the respective side members 81. The roll assemblies 90 cooperate to provide a planar support for the strip coplanar with the edge 41 and the upper surface of the roll 30. Each roll assembly comprises a shaft 91 extending between and outwardly of the respective members 81 through the bearings in the side and center members, and a roll 92 which is a thin tubular shell mounted on bearings 93 coaxially of and for rotation relative to the shaft 91. Each roll assembly includes a one-way clutch 94 mounted on the shaft 91 and in the roll 92 and oriented to prevent anti-clockwise rotation and to permit clockwise rotation of the roll 92 relative to the shaft 91.

Each pair of the roll assemblies 90 is connected by an endless chain 96 about a pair of sprockets 98 corotatably mounted on the respective adjacent shafts 91 such that clockwise rotation of any shaft 91 causes all of the roll assemblies 90 to be rotated clockwise as seen in FIGS. 2 and 4.

Conventional strip edge guides are provided by four rows 100 of small rollers perpendicular to the planar support. The individual rows 100, including all the rollers therein, are adjustable laterally of the shuttle to accomodate changes in width and location of the strip as desired. These rolls have been omitted from FIGS. 2 and 4 inasmuch as they do not come within the scope of the present invention.

A small diameter roller 105 extending between and supported rotatably on the respective side members 81 is disposed parallel to the drum axis at the forward end of the shuttle.

A further feature of the invention is the provision of two driving means by which the plurality of roll assemblies 90 are driven. The first of these driving means is operative while the shuttle 80 is in its receiving position and is provided by a pair of rolls 110, 112, the first (110) of which forms the rearward stop for the shuttle 80 as it is moved from the delivery to the receiving position by the cable cylinders 87. This first roll 110 is there held in friction rolling contact with the feed roll 30. The second (112) of the two rolls is arranged in permanent friction rolling contact with the first roll 110. Both are mounted on and extend between brackets 114 fixed on the respective side members 81. The second roll 112 has a corotatable sprocket 116 which is connected by the endless chain 118 to a sprocket 120 fixed on the shaft 91 of an adjacent roll assembly 90. The arrangement provides that, while the shuttle is in the receiving position, any rotation of the feed roll 30 is communicated immediately to the plurality of roll assemblies 90. A further advantage is provided in that the driving ratio of the sprockets 116, 120 provide conveniently for regulation of surface speed ratio between the feed roll 30 and the roll assemblies 90 in the shuttle. A ratio of 5 to 3 has been found satisfactory and serves to increase the surface speed of the roll assemblies 90 relative to the surface speed of the feed roll 30 to provide a slight tension and straightening effect as the strip travels from the feed roll to the shuttle.

The second drive means for the roll assemblies 90 is operative during the movement of the shuttle 80 toward the drum 16 after the length of strip has been cut off from the supply thereof. The first drive means ceases to be operative as the shuttle begins its forward movement because the first roll 110 moves with the shuttle out of driving contact with the feed roll. The second drive means comprises the friction track pads 130 which are mounted on and extend parallel to side rails 14 adjacent to the longitudinal bars 18, and the friction wheels 132 which are corotatably mounted on one of the shafts 91 outwardly of the respective sprockets 98 thereon. Each wheel 132 engages in frictional rolling contact with a pad 130 during forward movement of the shuttle 80 and rotates all of the roll assemblies 90 clockwise (FIG. 2). The arrangement provides that the surface speed of the roll assemblies is approximately twice the linear speed of the shuttle due to its forward movement alone. This effect is used to project the cut-to-length strip forwardly, to or beyond the small roller 105, and to contact with the carcass on the building drum.

An additional feature of the invention, previously referred to, is that of delivering to the tire building drum a cut-to-length strip and that the cutoff means is actuated in response to a photocell. An adjustably fixed line 139 close to the drum, to which the leading edge of the strip is advanced prior to actuation of the cutoff means, is defined by a light beam issuing from the photocell 140 and reflected by a target provided by a reflector bar 142. Referring again to FIGS. 1 and 4, the photocell 140 is disposed immediately above the reflector bar 142 which extends longitudinally and about centrally of each strip path between the small roll 105 and the forwardmost roll assembly 90', to cooperate with the photocell, providing enhanced light contrast with the strip. Each photocell is carried on a slide bracket 144 which is movable parallel to the reflector bar along a slide 146 of the fixture 148 supported by the parallel crossbars 150, 151 which extend between and are supported on legs 153 fixed to the side members 81. Each photocell with its bracket 144 is adjustable parallel to the reflector bar 142 by a knob 155 and screw 157 carried by the fixture 148 and threaded in the bracket. The arrangement provides for quick and easy adjustment of the actual length of the strip in accordance with the requirements of a particular carcass on the drum. The response of the photocell generated by the change, as the leading edge of the strip intercepts the light reaching and reflected by the bar 142, is an electrical signal which operates to deactivate the feed roll 30 and to actuate the cutoff means.

To extend the support for the strip between the forwardmost roll assembly 90' and the small roll 105, a plurality of rollers 160, 161, 162, 163, of successively lesser diameters, are rotatably mounted in and extend between the respective side members 81 and the reflector bars parallel to the drum 16. Rollers of respectively similar diameters are mounted in like manner between the respective reflector bars and the center member so that the strip is supported at closely spaced intervals from the feed roll 30 to the smell end roll 105.

An additional feature of the invention is the provision for control of the strip as the same moves from the shuttle 80 onto the drum 16 and winds about the drum, drawing the strip from the shuttle. It will be noted that the rolls 92 themselves offer no appreciable resistance to the strip as it is drawn onto the drum because the one-way clutches 94 release the rolls 92 from the driving shafts 91. To provide the aforesaid control of each strip, the spring tensioners 170 are mounted to swing about the crossbar 150 each in a plane normal to the drum axis. Each tensioner comprises a spheroidally shaped surface 171 having a contour very much resembling a common serving spoon and a resilient shank 172 resembling the handle of such spoon. The shank is attached to one arm 173 of a bellcrank 174. The crank 174 is actuated by a small air cylinder 176 pivotally connected at its rod end and head end, respectively, to the other arm 175 of the bellcrank 174 and to a clevis 176 fixed on the crossbar 151. As the strip moves onto the tire drum, the spoon surface 171 is swung downward to press against the strip between its longitudinal edges near the drum and is urged against the strip as it is drawn from the shuttle. The convexly rounded surface 171 applies pressure as well as light tension to the strip. For reasons not understood, the tensioner can steer the strip accurately about the tire when its contact surface 171 has been positioned between and relative to the longitudinal edges of the strip and therealong relative to the strip at or before its adhesion to the carcass on the drum. The position of the spoon-like surface 171 can best be determined by experiment.

Operation of the server in accordance with the invention will have become apparent to persons skilled in the art from the foregoing description but can be summarized as follows. Strip material of which sidewall material is representative is provided in a running length on a supply reel or the like and is trained over the rollers 24 and over the feed roll 30. The riding roll 34 is allowed to press on the strip on the feed roll which is then rotated to draw strip from the supply 26 and to project it forwardly onto the shuttle 80. The relatively increased surface speed of the roll assemblies 90 tends to slightly tension and straighten the strip as it moves to and along the shuttle. The leading edge of the strip moves forwardly on the shuttle to a point or line 139 established by adjustment of the photocell 140 position relative to the cutoff line at the shear edge 41, it being understood that the shuttle is in its receiving position during this phase of the operation. Upon interception of the photocell beam reflected from the reflector bar 142 surface, a signal is generated which activates the presser feet 70 to move downwardly and hold the strip on the knife bar 40 and then to move the carriage 44 and the knife 62 across the strips, shearing each trailing edge of the cut-to-length strip, as well as each leading edge of the strips to follow, along the plane which will provide a scarfed splice of approximately 35°.

At an appropriate time in the tire building cycle the cable cylinders 87 then move the shuttle, with the cut-to-length strip thereon, forwardly toward the drum. The friction wheel 132 engaging the track pad 130 during this forward movement rotates the roll assemblies 90 to project the strip forwardly sufficiently to be tacked on the carcass. The tensioner 170 is thereupon pressed on the strip while the strip is wound about the carcass and, as mentioned, tending to steer the strip into proper circumferential relation with the carcass on the drum. As the drum is rotated to draw the strip from the shuttle, the rolls 92 rotate freely thereby avoiding any undesirable elongation of the strip as it is applied to the carcass.

In the event that the length of the strip is not exact, the operator, observing the amount of length error, can quickly and simply adjust the position of the photocell, thereby correcting the measured length of the next succeeding strip.

After the strip has been delivered to the building drum, the shuttle 80 is moved back to its receiving position by operation of the cable cylinders 87 which movement again places the roll 110 in driving contact with the feed roll. The presser feet 70 having been retracted, the feed roll 30 again is actuated to move a next strip forward onto the shuttle and the operation can be repeated.

While certain representative embodiments and details have been shown for the purpose of illustrating the invention, it will be apparent to those skilled in the art that various changes and modifications may be made therein without departing from the spirit or scope of the invention.

What is claimed is:

1. The method of building a tire, wherein a strip of uncured tire building material, particularly of tire sidewall material, is supported along its length to have its leading end adhered to a tire carcass on a tire building drum and then be wrapped around the drum, which method is characterized by advancing the strip lengthwise to place its leading end at an adjustably fixed line close to the drum while supporting the strip at closely spaced intervals by a plurality of roll assemblies whose roll surfaces are driven at a surface speed greater than the speed of the strip being so advanced, severing the strip from a running length supply thereof along a cutoff line spaced a fixed distance from the drum, then moving the plurality of roll assemblies forward relatively to the cutoff line and toward the drum while rotating the roll assemblies to project the leading end forwardly of and beyond the roll assemblies to the drum, and rotating the drum to wrap the strip on the carcass while allowing the roll surfaces to rotate freely as the strip is drawn forward by the drum.

2. The method as claimed in claim 1, further characterized by applying to the strip between its longitudinally extending edges while the strip moves toward the drum from the shuttle a resiliently supported pressure instrument having a spheroidal surface to exert a force normal to and on the strip and a friction drag force thereon to maintain alignment of the strip relative to the drum while the strip wraps about the drum.

3. A server for delivering a strip of tire building material, particularly uncured sidewall material, to a tire building drum comprising a frame disposed in fixed relation to the drum, a shuttle mounted on the frame for reciprocable movement toward and away from the drum, means connected between the frame and the shuttle for effecting the reciprocable movement, a plurality of roll assemblies mounted in the shuttle parallel to each other and to the drum axis, each of said roll assemblies including a rotatable shaft, a roll disposed coaxially and rotatably about the shaft, and a one-way clutch between the roll and the shaft for preventing rotation of the roll relative to the shaft in one rotational sense and permitting free rotation of the roll relative to the shaft in the other sense, means drivingly connecting each shaft to the other shafts for synchronous rotation, a friction track pad on the frame, and a friction wheel corotatably mounted on one said shaft engageable in rolling engagement with said pad during said reciprocable movement whereby said roll assemblies are caused to rotate and to move the strip forwardly toward the drum relative to the plurality of roll assemblies.

4. A server for delivering a strip of tire building material, particularly uncured tire sidewall material, to a tire building drum comprising a frame disposed in fixed relation to the drum, a plurality of roll assemblies carried by said frame parallel to each other and to the drum axis and defining a planar support for the strip extending between a supply of such strip and the drum, and cutoff means comprising a knife bar fixed in said frame and having a shearing edge extending across the frame coplanar with the planar support, a carriage movable parallel to said shearing edge, and a circular knife mounted on the carriage to rotate freely in a plane at an acute angle with the planar support, said knife being unheated and having a concentric annular hollow ground relief radially inward of its shearing periphery in its side adjacent the shearing edge.

5. A server as claimed in claim 4, further comprising a plurality of pressure feet spaced laterally across said frame and engageable with the strip adjacent the shearing edge, and actuating means carried on the frame for moving said feet parallel said scarfing plane toward and away from the knife bar.

6. A server for delivering a strip of tire building material, particularly of sidewall material to a tire building drum, comprising a frame, cutoff means including a knife bar having a shearing edge extending across the frame, a feed roll mounted rotatably in the frame and operable to move the strip toward the cutoff means, a shuttle mounted on the frame for reciprocable movement between the cutoff means and the tire building drum and having a plurality of roll assemblies defining coplanar support for receiving the strip from the feed roll and for supporting the strip between the cutoff means and the drum, and drive means engaging the feed roll and connected to said roll assemblies while the strip is being advanced by the feed roll.

7. A server as claimed in claim 6, wherein said drive means includes speed ratio means for driving the roll assemblies at a surface speed greater than the surface speed of the feed roll.

8. A server as claimed in claim 7, said drive means further comprising a first roll mounted on the shuttle for engagement in friction driving contact with the feed roll while the shuttle is disposed to receive strip advancing thereover, a second roll mounted on the shuttle in friction driving contact with the first roll, a driven sprocket mounted on an adjacent one of the roll assemblies, a driving sprocket mounted on the second roll, an endless chain connecting the driving and the driven sprockets and means connecting the roll assemblies for synchronous rotation.

9. A server for delivering a strip of tire building material, particularly of sidewall material, to a tire building drum, comprising a frame having a pair of side rails disposed in fixed relation to the drum, a feed roll mounted rotatably in the frame, cutoff means including a bar having a shearing edge mounted in the frame to extend across the frame between the side rails adjacent and parallel to the feed roll, a shuttle having a plurality of parallel roll assemblies therein mounted on the side rails for reciprocable movement between a strip receiving position close to the feed roll and a delivering position close to the drum, first friction drive means mounted on the shuttle to engage the feed roll in the receiving position and connected to drive the roll assemblies at a surface speed greater than the surface speed of the feed roll, second friction drive means comprising a friction track pad on the frame, a friction wheel on one of the roll assemblies engageable with the pad during movement of the shuttle from the receiving to the delivering position to rotate the roll assemblies and move the strip forward relatively of the assemblies to the drum, and a spring tensioner mounted on the shuttle and movable to engage the strip between the drum and the shuttle while the same is drawn from the roll assemblies by the drum.

* * * * *